2,997,555
SAFETY SLIDE FOR BUS DUCT

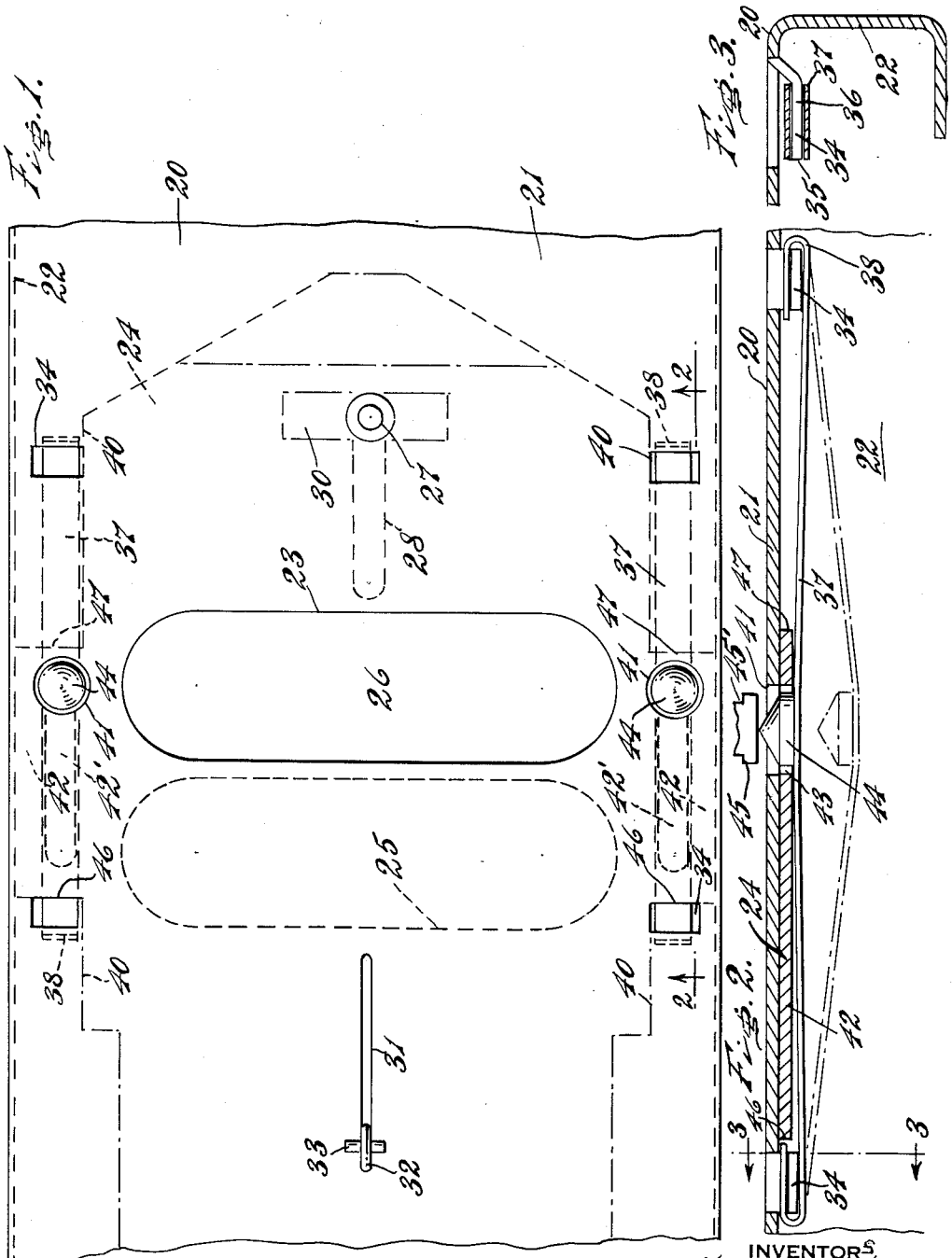

Elmer T. Carlson, Center Valley, and William A. Kuhar, Bethlehem, Pa., assignors to Electric Distribution Products, Inc., Allentown, Pa., a corporation of Delaware
Filed Feb. 8, 1960, Ser. No. 7,471
4 Claims. (Cl. 200—50)

The present invention relates to safety slides for bus ducts or busways.

A purpose of the invention is to reduce the cost and simplify the procedure for mounting a safety slide on a bus duct.

A further purpose is to permit a safety slide leaf spring to be mounted on lanced spring abutments which are part of the housing, the leaf spring performing the function of introducing a locking button into the safety slide and spring urging the safety slide against the housing, while the spring abutments act as stops or limiters for the safety slide.

A further purpose is to reduce the danger of vibration of a safety slide on a bus duct by continuously gripping the safety slide under the action of springs which are mounted directly on the housing itself.

Further purposes appear in the specification and in the claims.

In the drawings we have chosen to illustrate one only of the numerous embodiments in which our invention may appear, selecting the form shown from the standpoints of convenience in illustration, satisfactory operation and clear demonstration of the principles involved.

FIGURE 1 is a fragmentary top plan view of a bus duct according to the invention.

FIGURE 2 is an enlarged fragmentary section on the line 2—2 of FIGURE 1.

FIGURE 3 is a fragmentary section on the line 3—3 of FIGURE 2.

Describing in illustration but not in limitation and referring to the drawings:

In the prior art bus ducts have been employed having access openings covered by a safety slide. In order to mount the safety slide, it was necessary to insert brackets which were costly and troublesome, and could become detached when the bus duct was subjected to rough service, such as dropping from considerable heights.

By the present invention, spring abutments or projections have been lanced from the housing itself and the spring abutments serve as mountings for the ends of leaf springs, and also serve as stops for the safety slide, while the safety slide itself prevents the springs from coming off the spring abutments.

The bus duct of the present invention is of the character shown in Carlson and Constantine U.S. Patents No. 2,786,908, granted March 26, 1957, for Electrical Distribution System; No. 2,825,775, granted March 4, 1958, for Electrical Distribution System; and No. 2,879,319, granted March 24, 1959, for Bus Duct System.

A metallic housing 20 is of rectangular cross section and has relatively wide sides 21 and relatively narrow ends 22 which surround a construction of insulators and bus bars of well known character as shown in the patents aforesaid.

In order to permit access to the bus bars by a plug-in device or the like of well known character (see the patents), an access opening 23 is provided at intervals along each of the sides of the bus duct. The access opening shown is elongated laterally so that contact with all bus bars can be obtained.

In order to protect personnel against unintended access to the bus bars, it is necessary to provide a safety slide which in one position can cover and in another position can open the access opening.

On the inside of the side wall of the bus duct, resting against it, is a safety slide 24 which is suitably of metallic sheet such as steel or aluminum similar to the material of the bus duct housing. The safety slide has an opening 25 which in open position of the safety slide aligns with the opening 23 in the housing and it has a closed portion 26 which in closed position of the safety slide closes the access opening.

A headed snap rivet 27 located at the center of the bus duct side beyond the access opening passes through an opening in the bus duct and passes through a longitudinally elongated slot 28 in the safety slide and on the inside of the safety slide receives a rectangular spring washer 30 which urges the safety slide toward the bus duct housing.

At a position suitably on the opposite side of the access opening from the rivet 27, there is a longitudinally elongated slot 31 centrally positioned in the bus duct housing and through this protrudes a tongue 32 on the safety slide which acts as an operating handle to move the safety slide back and forth. The handle 32 receives a pin 33 on the outside of the housing which holds the safety slide against moving inward away from the housing.

As best seen in FIGURE 3, the side of the housing at positions longitudinally forward and rearward of the access opening 26 and adjoining each end or edge has a lanced spring abutment 34 which has an open end 35 toward the center of the housing and has a portion 36 which is straight and extends parallel to the side of the housing on the inside of the housing, in spaced relation thereto.

Leaf springs 37 suitably of a spring material such as beryllium copper extend longitudinally adjoining the opposite ends or edges of the housing and have reverse bends 38 at the ends which hook over the spring abutments 34 as best seen in FIGURES 2 and 3.

Opposite edge portions 40 of the safety slide in all positions of the safety slide are quite close to the sides of the leaf springs and engage close to the reverse portions of the springs so that it would be impossible for the springs to slip off the ends 35 of the spring abutments 34, once the springs are in place.

At a position in line with the access opening 26 and corresponding to the location of the leaf springs, there are openings 41 through the housing which permit entry of a deflecting device from the plug-in.

The safety slide at each end has a wing or extension 42 which protrudes edgewise or endwise of the bus duct beyond the leaf springs and into the space between the leaf springs and the side of the housing, as best seen in FIGURE 2. The wings or extensions 42 have openings 43 best seen in FIGURE 2 which, when the safety slide is in the closed position, align with the deflecting openings 41 of the housing.

Secured to the center of each leaf spring is a locking button 44 which suitably has a conically tapered forward edge and which in closed position intrudes into the deflecting opening 43 of the safety slide and locks the safety slide against motion longitudinally, When, however, a plug-in device of well known character registers with the safety slide its deflector pins 45 line up with the deflector openings 41 and the locking buttons 44 and enter the deflector opening and deflect the locking button to the position shown in dot-and-dash lines in FIGURE 2, at which position the operator moving the handle 32 can deflect the safety slide. As the safety slide closes, walls of longitudinal grooves 42' in the wings of the safety slide enter annular grooves 45' in the deflector pins 45 and hold the plug-in in place.

When the safety slide is closed, the edges 46 of the wings or extensions 42 come against the adjacent spring abutments or the hook ends of the springs there located and these act as stops. In open position of the safety slide, the edges 47 of the wings or extensions 42 engage the opposite spring abutments or the opposite ends of the springs and this similarly acts as a stop in the opposite position. This action is supplemental to the stop action of the slot 28 and is advantageous because it is located at positions near the edges of the bus duct and keeps the safety slide aligned.

In operation of the device, it will be evident that the user in order to open the safety slide connects the plug-in device to the bus duct and this brings the deflector projections 45 into position to deflect the locking buttons 44 until the safety slide can be moved to open position. After the plug-in contacts have been removed from the bus ducts, the operator is permitted to retract the safety slide, and then when the plug-in device is removed the locking buttons 44 lock the safety slide in place so that it cannot be tampered with.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a bus duct, a bus duct housing having an access opening in one side of the housing for permitting access to the interior thereof, a safety slide having an opening for cooperating with the bus duct opening and having a closure wall for covering the bus duct opening, slidable longitudinally of the bus duct between two positions and including means for moving the bus duct slide, spring abutments projecting from the bus duct housing at opposite longitudinal positions on opposite edges of the housing extending into the interior of the housing, leaf springs on the interior of the housing adjoining the opposite edges and secured at opposite ends to the spring abutments, the leaf springs being adjacent edge portions of the safety slide, the leaf springs being bowed toward the safety slide and urging the safety slide toward the housing locking buttons on the leaf springs at mid points directed toward the housing, there being openings in the housing which cooperate with the locking buttons, and there being openings in the safety slide at opposite edges which in closed position of the slide cooperate with the locking buttons.

2. In a bus duct, a generally rectangular housing having sides and ends, the housing having an acess opening at one of the sides, fingers lanced from the side of the housing adjoining each end and in position on each side of the access opening for spring abutments, leaf springs extending longitudinally on the inside of the housing adjacent each end, the opposite ends of the leaf springs being anchored in the spring abutments, locking buttons at mid points on the leaf springs directed toward the housing, there being openings in the housing which receive the locking buttons, and the leaf springs in retracted position being urged and bowed toward the housing, a safety slide extending along the inside of the side of the housing having an opening which in one position cooperates with the opening in the housing and being slidable to another position at which the safety slide closes the opening in the housing, the safety slide having extensions at opposite ends which intrude into the space between the leaf springs and the housing, in one limiting position adjoining one set of spring abutments and in the opposite limiting position adjoining the opposite set of spring abutments, the extensions on the safety slide having openings which in closed position of the safety slide cooperate with the locking buttons and with the corresponding openings in the housing, there being a longitudinal slot in the housing opposite the safety slide at one end, slide engaging means accessible through the longitudinal slot and guiding the safety slide on the housing and means at the opposite end of the safety slide for guiding the safety slide on the housing.

3. A bus duct of claim 2 in which the lanced spring abutments have open ends toward the edges of the safety slide and the edges of the safety slide constantly occupy a position adjoining the open ends of the spring abutments, thus preventing the possibility that the leaf springs can become displaced from the spring abutments.

4. A bus duct of claim 2, adapted to cooperate with a plug-in device having projections with locking slots, in combination with interlock slots on the extensions of the safety slide extending longitudinally in line with the locking buttons and adapted to enter the locking slots.

References Cited in the file of this patent
UNITED STATES PATENTS 2,907,839     Carlson et al. _____ Oct. 6, 1959